US012798405B2

(12) United States Patent
Furukawa et al.

(10) Patent No.: US 12,798,405 B2
(45) Date of Patent: Nov. 17, 2026

(54) ELECTRIC VEHICLE

(71) Applicant: Hitachi Industrial Products, Ltd., Tokyo (JP)

(72) Inventors: Isao Furukawa, Tokyo (JP); Hiroaki Miyata, Tokyo (JP); Kazuhiro Imaie, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 18/873,590

(22) PCT Filed: Jul. 8, 2022

(86) PCT No.: PCT/JP2022/027051

§ 371 (c)(1), (2) Date: Dec. 10, 2024

(87) PCT Pub. No.: WO2024/009488

PCT Pub. Date: Jan. 11, 2024

(65) Prior Publication Data

US 2025/0368059 A1 Dec. 4, 2025

(51) Int. Cl.

*B60L 53/00* (2019.01)
*B60L 50/10* (2019.01)
*B60L 50/53* (2019.01)

(52) U.S. Cl.

CPC ............... *B60L 53/00* (2019.02); *B60L 50/10* (2019.02); *B60L 50/53* (2019.02); *B60L 2240/12* (2013.01)

(58) Field of Classification Search

USPC .................................................. 307/9.1-10.1

See application file for complete search history.

(56) References Cited

U.S. PATENT DOCUMENTS

2013/0113279 A1 5/2013 Hatanaka
2013/0144472 A1* 6/2013 Ruth .................... G05D 1/0278 903/902

(Continued)

FOREIGN PATENT DOCUMENTS

CN 109305061 B 8/2021
JP 2001-222790 A 8/2001

(Continued)

OTHER PUBLICATIONS

International Search Report (PCT/ISA/210) issued in PCT Application No. PCT/JP2022/027051 dated Sep. 20, 2022 with English translation (7 pages).

(Continued)

*Primary Examiner* — Menatoallah Youssef
*Assistant Examiner* — Aqeel H Bukhari
(74) *Attorney, Agent, or Firm* — Crowell & Moring LLP

(57) ABSTRACT

The objective of the present invention is to provide electric vehicles with which electric power can be shared between two electric vehicles so as to be able to travel. To achieve said objective, this electric vehicle comprises a power collector connected to overhead wiring, a storage battery, an electric motor driven by power supply from the overhead wiring or the storage battery, and wheels driven by the electric motor, the electric vehicle being configurated such that a connection device for receiving electric power from another electric vehicle is connected, the electric motor is driven by electric power supplied through the connection device so that the electric vehicle can travel, and connection lines of the connection device do not come off.

8 Claims, 13 Drawing Sheets

(56) References Cited

U.S. PATENT DOCUMENTS

| | | | | |
|---|---|---|---|---|
| 2015/0343906 | A1 | 12/2015 | Hatanaka et al. | |
| 2016/0288664 | A1* | 10/2016 | Biagini | B60L 53/14 |
| 2018/0201144 | A1 | 7/2018 | Newman | |
| 2018/0239362 | A1* | 8/2018 | Amla | G05D 1/0295 |
| 2019/0049996 | A1 | 2/2019 | Aikin et al. | |
| 2020/0282857 | A1 | 9/2020 | Mortensen et al. | |
| 2023/0182600 | A1* | 6/2023 | Salter | B60P 3/06 701/22 |

FOREIGN PATENT DOCUMENTS

| | | | |
|---|---|---|---|
| JP | 2016-12949 | A | 1/2016 |
| JP | 2020-58105 | A | 4/2020 |
| WO | WO 2014/128936 | A1 | 8/2014 |

OTHER PUBLICATIONS

Japanese-language Written Opinion (PCT/ISA/237) issued in PCT Application No. PCT/JP2022/027051 dated Sep. 20, 2022 with English translation (12 pages).

Extended European Search Report issued in European Application No. 22950282.8 dated Mar. 24, 2026 (14 pages).

* cited by examiner

ELECTRIC VEHICLE

TECHNICAL FIELDS

The present invention relates to an electric vehicle, particularly an electric vehicle that can run even when the power source is gone.

BACKGROUND TECHNOLOGY

In an electric vehicle, when the remaining amount of the storage battery is exhausted and the power source is gone, it is possible to mechanically tow by another vehicle if it is an electric vehicle at the level of a passenger car, but it is assumed that it will be difficult when the mass is large, such as a dump truck.

As a prior art document in the present art, there is a patent literature 1 for example. Patent literature 1 discloses a trolley-type electric drive vehicle capable of driving an electric motor by switching between a power supply from a generator and a power supply from an overhead line.

PRIOR ART DOCUMENTS

Patent Literature

Patent Literature 1: JP2016-12949A

SUMMARY OF THE INVENTION

Problem to be Solved by the Invention

Patent literature 1 discloses an electric drive vehicle that can run by supplying power from a generator generated by an engine even if there is no power supply from the overhead wiring. However, if there is no fuel to drive the engine, if there is no power supply from the overhead wiring, it will not be possible to run on its own, in addition, in the case of large dump trucks such as those used in mines, there was a problem that it was not easy to mechanically tow them by other vehicles.

An object of the present invention is to provide an electric vehicle that can run by interchanging electric power between two electric vehicles in view of the above issues.

Means to Solve the Problem

The present invention is, to give an example, an electric vehicle having a current collector connected to an overhead line, a storage battery, an electric motor driven by a power supply from an overhead wiring or a storage battery, and a wheel driven by an electric motor, and a connection device for interchanging power from other electric vehicles is connected, and the electric motor can be worked and driven by the electric power supplied through the connection device, and the connection wire constituting the connection device is configurated so that it does not come off.

Effect of the Invention

According to the present invention, an electric vehicle that can be driven by interchanging power between two electric vehicles can be provided.

DESCRIPTION OF EMBODIMENTS

Hereinafter, embodiments of the present invention will be described using drawings.

Embodiment 1

Figure 1A:
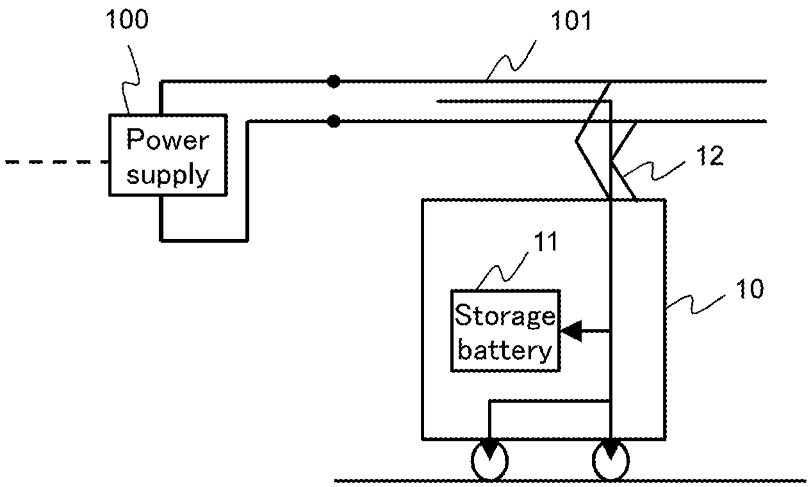
FIG. 1A It is a configuration explanatory diagram of a trolley-type electric vehicle that is a premise of Example 1.
Figure 1B:
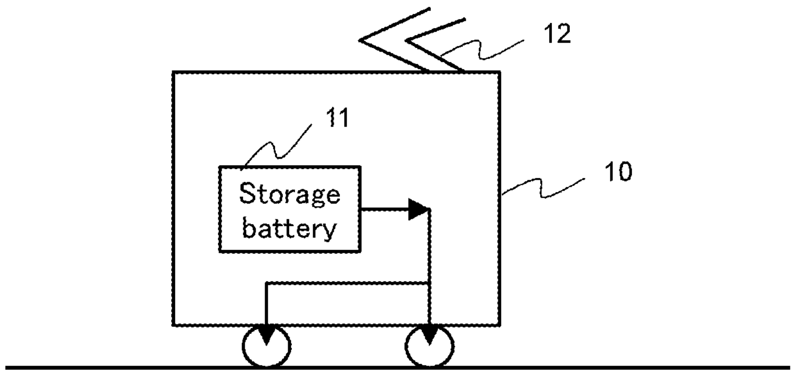
FIG. 1B It is an explanatory diagram of the configuration of a trolley-type electric vehicle that is a premise of Example 1

FIGS. 1A and 1B are explanatory diagrams of a trolley-type electric vehicle that is a premise of the present embodiment. In FIG. 1A, the electric vehicle 10 receives power from the power supply 100 from an external power system via a power collector 12 such as a pantograph from the overhead wiring 101. Other than the electric vehicle 10, it is a ground facility, and the electric vehicle 10 drives an electric motor with electric power supplied from the overhead wiring 101 where there is an overhead wiring 101. Further, the storage battery 11 is charged at the same time. As shown in FIG. 1B, in a place where there is no overhead wiring 101, the electric vehicle 10 drives an electric motor with electric power charged to the storage battery 11. Therefore, if the charging power of the storage battery 11 is exhausted, the electric motor cannot be driven and the vehicle cannot be driven by itself.

Here, in the case of a large dump truck such as that used in a mine, the weight of the dump truck may exceed several tens of tons considering the weight of the ore loaded on the bed in addition to the weight of the main body, and there is a problem that it is not easy to mechanically tow by other vehicles.

Therefore, in the present embodiment, an electric vehicle is configurated in which electric power is exchanged between two electric vehicles and can be traveled. In the case of a train using a railway, it is known that power is supplied between the vehicles, but the train is kept constant between the vehicles by a coupler, in the electric vehicle in the present embodiment, since each of the two electric vehicles can run independently, it is necessary to device a way to maintain the power supply by maintaining the distance between the electric vehicles. Hereinafter, this embodiment will be described.

Figure 2:
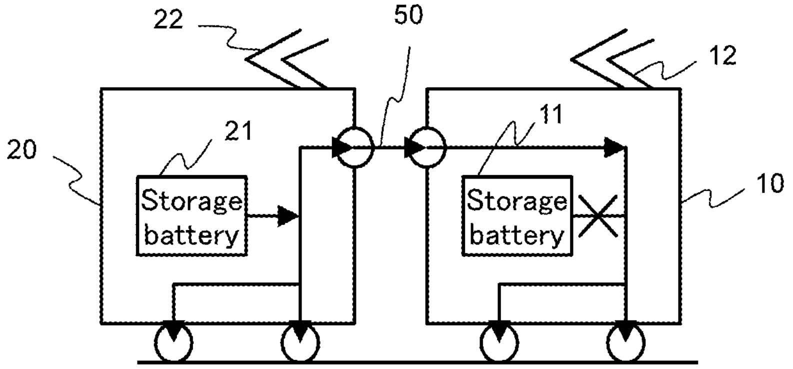
FIG. 2 It is an explanatory diagram of the power interchange of the trolley-type electric vehicle in Example 1

FIG. 2 is an explanatory diagram of the configuration of power interchange of a trolley-type electric vehicle in this embodiment. In FIG. 2, the same configuration as in FIG. 1 is denoted by the same numerals, and the description thereof is omitted. In FIG. 2, the difference from FIG. 1 is that the second electric vehicle 20 intercedes and supplies power to the electric vehicle 10 that has lost the charging power of the storage battery 11 via the connection device 50. Here, since the connection device 50 is a device for interchanging power between electric vehicles, it is composed of a connection wire such as a conductive cable or a copper plate and a connection terminal provided in each electric vehicle. The second electric vehicle 20 receives power from a power source from an external power system via a power collector 22 such as a pantograph from the overhead wiring 101 in the same manner as the electric vehicle 10, and charges the storage battery 21. In addition, both electric vehicles are driven by a driver, and both vehicles run on the electricity supplied by one electric vehicle. Here, if the connection line constituting the connection device is disconnected, power cannot be interchanged, so it is necessary to prevent the connection line from being disconnected.

Figure 3:
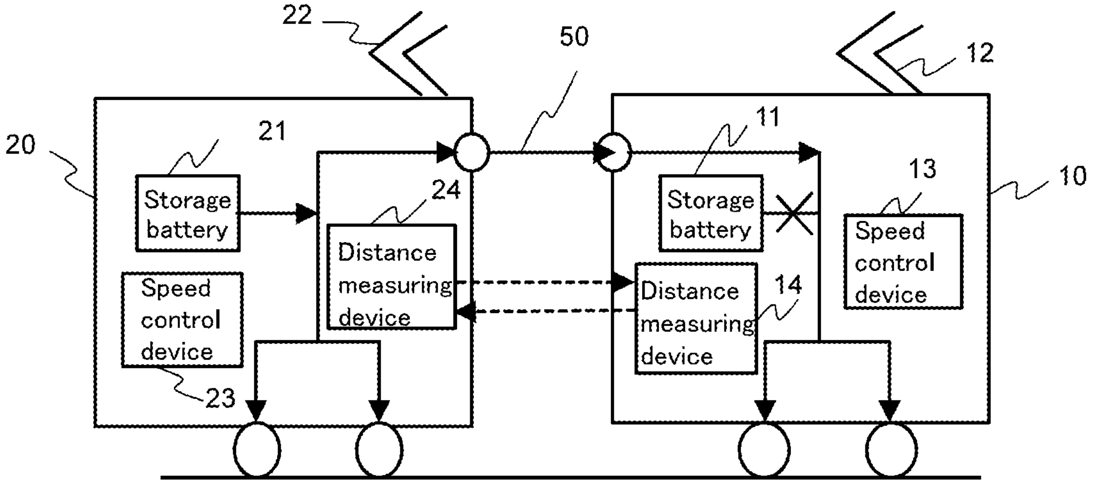
FIG. 3 It is an explanatory diagram of the configuration of power interchange by the connection device of a trolley-type electric vehicle in Example 1

FIG. 3 is an explanatory diagram of a configuration of power interchange by a connection device of a trolley-type electric vehicle in this embodiment. In FIG. 3, the same configuration as in FIG. 2 is denoted by the same numerals, and the description thereof is omitted. In FIG. 3, the difference from FIG. 2 is that a distance measuring device and a speed control device are provided in each electric vehicle.

In FIG. 3, the electric vehicle 10 and the second electric vehicle 20 measure the distance between the vehicle bodies with the distance measuring devices 14 and 24 using a laser or the like so that the connection line of the connection device 50 is not disconnected, and speed control is performed by the speed control devices 13 and 23 so that they do not stay more than a certain distance, respectively.

Figure 4:
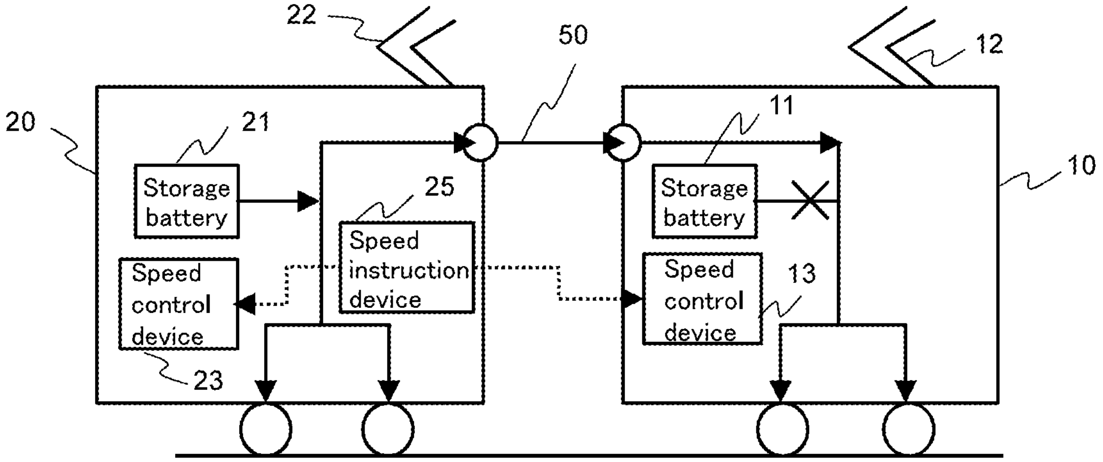
FIG. 4 It is another explanatory diagram of the power interchange by the connection device of the trolley-type electric vehicle in Example 1.

FIG. 4 is another explanatory diagram of power interchange by a connection device of a trolley-type electric vehicle in the present embodiment. In FIG. 4, the same configuration as in FIG. 2 is denoted by the same numerals, and its description is omitted. In FIG. 4, the difference from FIG. 2 is that one electric vehicle has a speed command device and a speed control device is provided in each electric vehicle.

In FIG. 4, the second electric vehicle 20 outputs a speed command by the speed instruction device 25, and the electric vehicle 10 and the second electric vehicle 20 each execute speed control by the speed control devices 13 and 23 so that they travel at the same speed according to the speed instruction. A speed instruction device may be provided in the electric vehicle 10.

Figure 5:
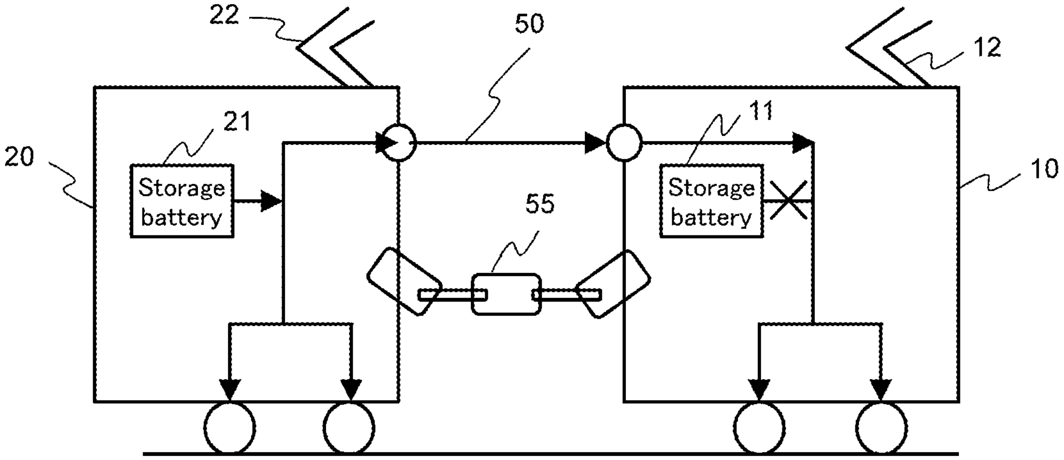
FIG. 5 It is another explanatory diagram of the power interchange by the connection device of the trolley-type electric vehicle in Example 1.

FIG. 5 is another configuration explanatory diagram of power interchange by a connection device of a trolley-type electric vehicle in the present embodiment. In FIG. 5, the same configuration as in FIG. 2 is denoted by the same numerals, and the description thereof is omitted. In FIG. 5, the difference from FIG. 2 is that the connecting line constituting the connection device is connected separately from the connection device by a interlocking device 55 such as a chain so that it does not leave more than a certain distance.

Figure 6:
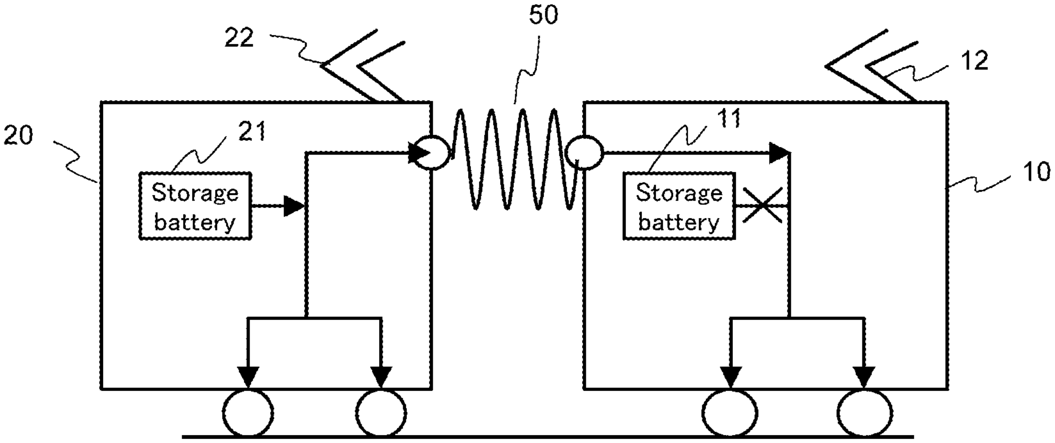
FIG. 6 It is another explanatory diagram of the power interchange by the connection device of the trolley-type electric vehicle in Example 1.

FIG. 6 is another explanatory diagram of power interchange by a connection device of a trolley-type electric vehicle in the present embodiment. In FIG. 6, the same configuration as in FIG. 2 is denoted by the same numerals, and the description thereof is omitted. In FIG. 6, the difference from FIG. 2 is that the connection line can be extended so that the connection line constituting the connection device does not come off. That is, the length of the connection line is set longer than the assumed distance between the electric vehicles, and it is configurated so that there is an extra length. Alternatively, the connection line is made in the form of a bellows and configurated so that the position of both ends is variable in the telescopic direction.

Figure 7:
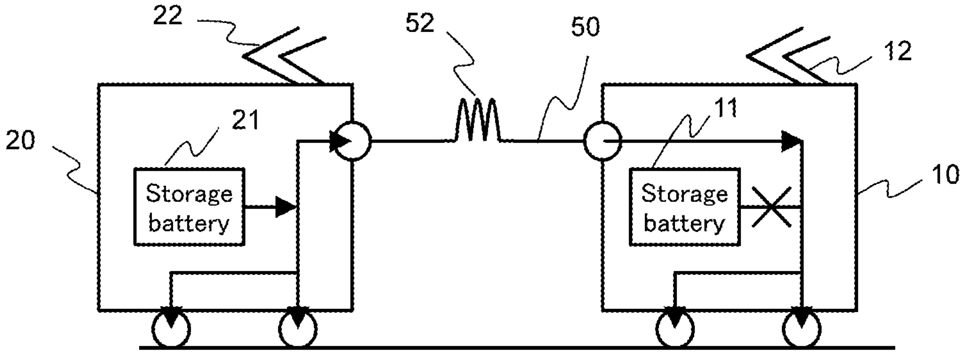
FIG. 7 It is another explanatory diagram of the power interchange by the connection device of the trolley-type electric vehicle in Example 1.

FIG. 7 is another configuration explanatory diagram of power interchange by a connection device of a trolley-type electric vehicle in the present embodiment. In FIG. 7, the same configuration as in FIG. 2 is denoted by the same numerals, and the description thereof is omitted. In FIG. 7, the difference from FIG. 2 is that the reactor 52 is provided on the connection line constituting the connection device 50. That is, a reactor 52 is provided to prevent resonance due to the inductance of the connection line.

Figure 8A:
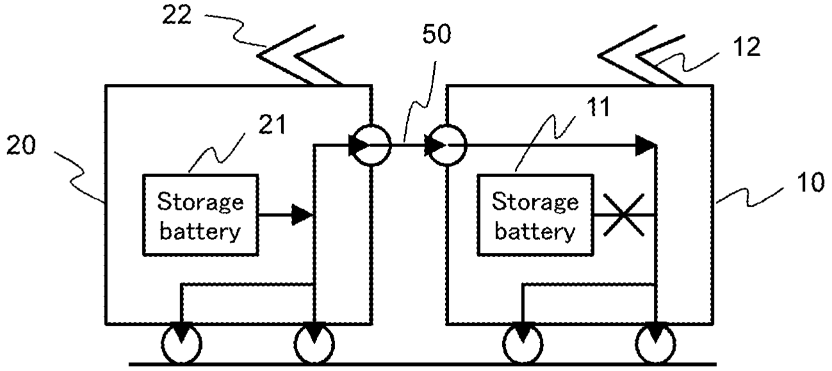
FIG. 8A It is a diagram illustrating a combination of electric vehicles that interchange electric power in Example 1.
Figure 8B:
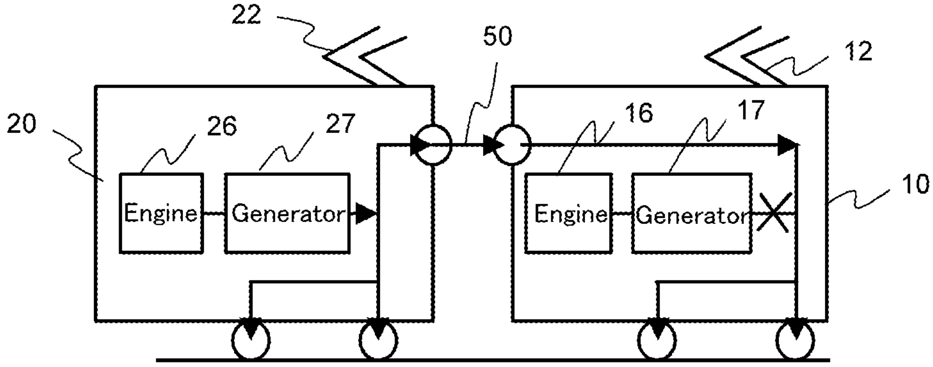
FIG. 8B It is a diagram illustrating a combination of electric vehicles that interchange electric power in Example 1.
Figure 8C:
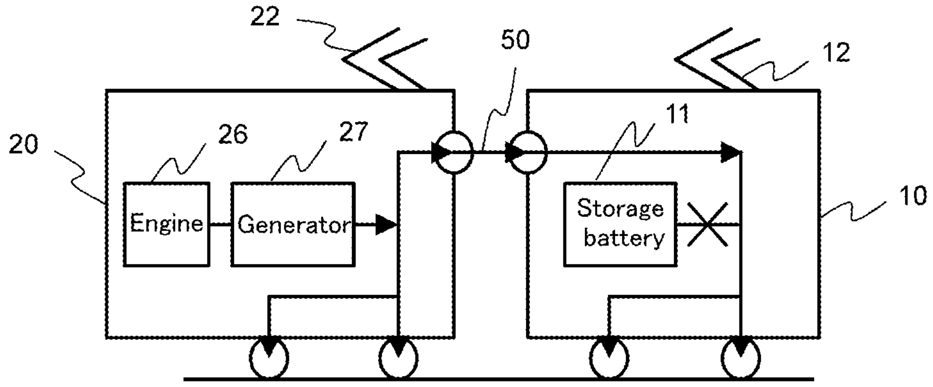
FIG. 8C It is a diagram illustrating a combination of electric vehicles that interchange electric power in Example 1.

FIGS. 8A, 8B, and 8C are diagrams illustrating a combination of electric vehicles that interchange power in the present embodiment. FIG. 8A shows a combination of a vehicle equipped with a storage battery and a vehicle equipped with a storage battery in the same configuration as in FIG. 2. FIG. 8B shows a combination of electric vehicles 10 and 20 that can run by supplying power from a generator that generates electricity, in which the electric vehicles 10 and 20 have engines 16 and 26, respectively, and generators 17 and 27 driven by them, and it shows a combination of electric vehicles that can run by supplying electricity from a generator that generates electricity. FIG. 8C is a compromise between FIGS. 8A and 8B, showing a combination of a vehicle equipped with a generator and a vehicle equipped with a storage battery. In the configuration of FIGS. 8B and 8C, since electric power is supplied from a generator worked by the engine, continuous operation is possible by supplying fuel.

In this way, the drive power source of an electric vehicle is supplied from mounted storage batteries, from mounted generators, alternatively, from ground equipment via overhead wiring by power collector such as a pantograph, or with there combination, and combinations can be of different types.

As described above, according to the present embodiment, even if the power source disappears, such as the charging power of the mounted storage battery has disappeared in a place where there are no overhead wires, it is possible to provide a trolley-type electric vehicle that can travel by interchanging electric power using a connection device between two electric vehicles.

Embodiment 2

This embodiment will describe an example in which power interchange of a trolley-type electric vehicle is performed using overhead wiring.

Figure 9:
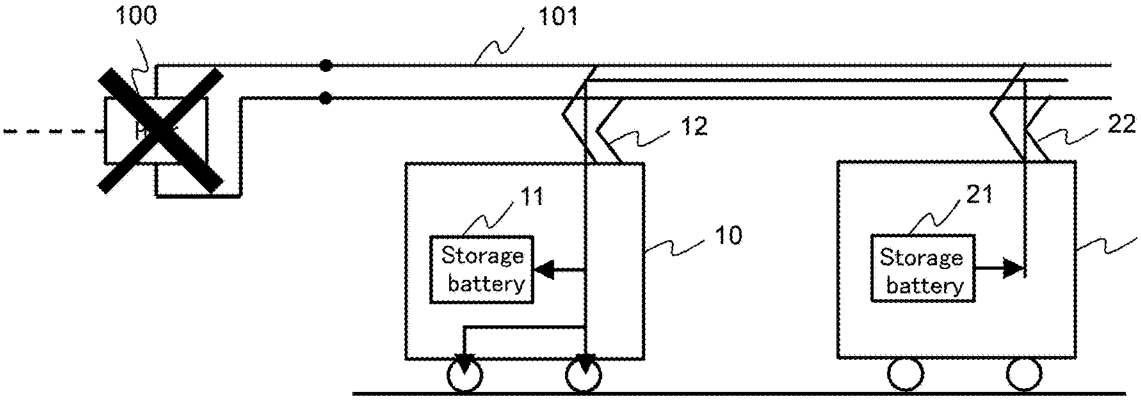
FIG. 9 It is an explanatory diagram of the configuration of power interchange by overhead wirings of a trolley-type electric vehicle in Example 2.

FIG. 9 is an explanatory diagram of the configuration of power interchange by overhead wiring of a trolley-type electric vehicle in the present embodiment. In FIG. 9, the same configuration as in FIGS. 1A and 2 is denoted by the same numerals, and the description thereof is omitted.

In FIG. 9, the electric vehicle 10 is driven by electric power supplied from the overhead wiring 101 and simultaneously charged to the storage battery 11, but when the ground equipment fails, the power supply from the power supply 100 from the external power system cannot be received and the charging power of the installed storage battery 11 also runs out. In that case, the electric vehicle 10 receives power interchange from the other electric vehicle 20 through the overhead wiring 101. That is, when the ground power supply facility is faulty, another electric vehicle 20 that has sufficient charging power is connected to the overhead wiring, and power is supplied to the electric vehicle 10 via the overhead wiring.

As described above, according to the present embodiment, even if the ground equipment fails, a trolley-type electric vehicle that can run by interchanging power between two electric vehicles using overhead wiring can be provided.

Embodiment 3

The present embodiment describes an electric vehicle that does not have a power collector such as a pantograph and can run on power supply by an on-board storage battery without receiving power from overhead wiring.

Figure 10:
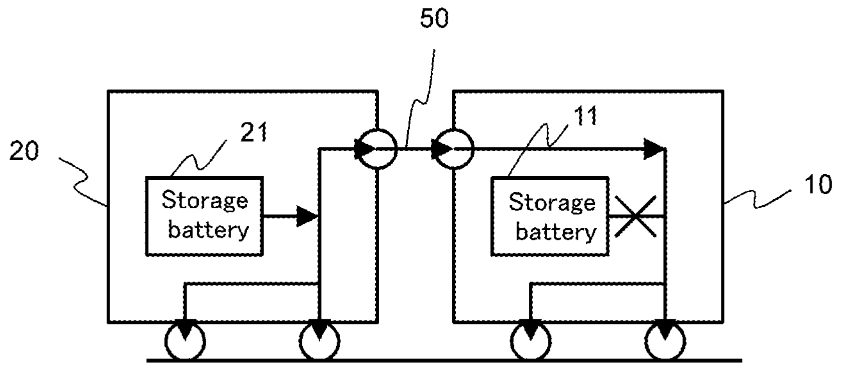
FIG. 10 It is an explanatory diagram of the configuration of power interchange by the connection device of the electric vehicle in Example 3.

FIG. 10 is a configuration diagram of power interchange by a connection device of an electric vehicle in the present embodiment. In FIG. 10, the same configuration as in FIG. 2 is denoted by the same numerals, and the description thereof is omitted. In FIG. 10, the difference from FIG. 2 is that the electric vehicles 10 and 20 do not have power collectors 12 and 22 such as pantographs that receive power from overhead wiring.

In the present embodiment, as in FIG. 2, drives are on both electric vehicles, and each is driven by a driver, and both vehicles run with electric power supplied by one electric vehicle. Further, if the connection wire constituting the connection device is disconnected, power interchange becomes impossible, so it is necessary to prevent the connection line from being disconnected. Therefore, in the present embodiment, by adopting the same configuration as described in FIGS. 3 to 6, the connection line is prevented from being disconnected, and running with stable power interchange is possible. Further, in the present embodiment, as described in FIG. 7, resonance due to the inductance of the connection line can be prevented by a configuration in which a reactor is provided on the connection line.

Furthermore, in the present embodiment, as described in FIGS. 8A to 8C, the drive power source of the electric vehicle is supplied by an on-board storage battery, an on-board generator, or a combination thereof, and combinations can be of different types.

As described above, according to the present embodiment, even if the power source disappears, such as the running out of charging power of the mounted storage battery, an electric vehicle that can run by interchanging power using a connection device between two electric vehicles can be provided.

As described above, examples according to the present invention have been shown, the present invention can provide an electric vehicle that can run by interchanging electric power between two electric vehicles even when the power source disappears. As a result, work efficiency such as transportation using electric vehicles is improved, and it has the effect of reducing human resource costs. Accordingly, the present invention contributes to achieving a high level of economic productivity through technological improvement and innovation, especially in item 8 "Decent Work and Economic Growth" in order to realize the SDGs (Sustainable Development Goals).

Further, the present invention is not limited to the above-mentioned embodiments, and various modifications are included. For example, the above examples have been described in detail in order to explain the present invention in an easy-to-understand manner, and are not necessary limited to those comprising all the described configurations. It is also possible to replace some of the configurations of one embodiment with the configurations of other embodiments, and it is also possible to add configurations of other embodiments to the configurations of one embodiment. It is also possible to add, delete, or replace other configurations for a part of the configuration of each embodiment.

EXPLANATION OF THE SIGN

101: overhead wiring, 10, 20: electric vehicle, 11, 21: storage battery, 12, 22: power collector, 50: connection device, 13,23: speed control device, 14, 24: distance measuring device, 25: speed instruction device, 16,26: engine, 17, 27: generator, 52: reactor, 55: interlocking device

The invention claimed is:

1. An electric vehicle comprising:

a power collector connected to an overhead wiring;

a storage battery;

an electric motor driven by a power supply from the overhead wiring or the storage battery;

wheels driven by the electric motor;

a connection device configured to provide power to the electric vehicle from another electric vehicle, and enable the electric vehicle to run by operating the electric motor with the electric power supplied via the connection device;

wherein the connection device includes a connection line configured to prevent disconnection between the electric vehicle and the another electric vehicle; and wherein the connection line includes a distance measuring device for measuring the distance between the vehicle bodies and a speed control device for controlling the speed so that the electric vehicle and the another electric vehicle stay within a certain distance of each other; and a reactor configured to prevent resonance due to inductance of the connection line, the reactor being arranged in a middle of the connection line between adjacent electric vehicles.

2. The electric vehicle according to claim 1, wherein the connection line includes a connection wire such as a conductive cable or a copper plate and a connection terminal.

3. The electric vehicle according to claim 1, wherein the connection line includes an interlocking device, including a chain, which is configured to maintain a certain distance between the electric vehicle and the another electric vehicle.

4. The electric vehicle according to claim 1, wherein a length of the connection line is set longer than an assumed distance between the electric vehicles and set so that there is a surplus length.

5. The electric vehicle according to claim 1, wherein an engine and a generator driven by the engine are provided, and the electric motor is driven by a power supply from the generator that generates electricity.

6. An electric vehicle comprising:

a storage battery;

an electric motor driven by a power supply from the storage battery;

wheels driven by the electric motor;

a connection device configured to provide power to the electric vehicle from another electric vehicle, and enable the electric vehicle to run by operating the electric motor with the electric power supplied via the connection device;

wherein the connection device includes a connection line configured to prevent disconnection between the electric vehicle and the another electric vehicle; and wherein the connection line includes a distance measuring device for measuring the distance between the vehicle bodies and a speed control device for controlling the speed so that the electric vehicle and the another electric vehicle stay within a certain distance of each other; and a reactor configured to prevent resonance due to inductance of the connection line, the reactor being arranged in a middle of the connection line between adjacent electric vehicles.

7. The electric vehicle according to claim 6, wherein the connection line includes an interlocking device, including a chain, which is separate from the connection device and is configured to maintain a certain distance between the electric vehicle and the another electric vehicle.

8. The electric vehicle according to claim 6, wherein a length of the connection line is set longer than an assumed distance between the electric vehicles, and is set so that there is a surplus length.

* * * * *